_(12)_ United States Patent
Anbalagan

(10) Patent No.: US 11,245,702 B2
(45) Date of Patent: Feb. 8, 2022

(54) SECURITY VULNERABILITY ASSESSMENT FOR USERS OF A CLOUD COMPUTING ENVIRONMENT

(71) Applicant: RED HAT, INC., Raleigh, NC (US)

(72) Inventor: Prasanth Anbalagan, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 320 days.

(21) Appl. No.: 16/406,838

(22) Filed: May 8, 2019

(65) Prior Publication Data

US 2020/0358780 A1    Nov. 12, 2020

(51) Int. Cl.
*H04L 29/06*    (2006.01)

(52) U.S. Cl.
CPC .......... *H04L 63/102* (2013.01); *H04L 63/105* (2013.01); *H04L 63/1433* (2013.01); *H04L 63/20* (2013.01)

(58) Field of Classification Search
CPC .. H04L 63/102; H04L 63/105; H04L 63/1433
USPC .......................................................... 726/28
See application file for complete search history.

(56) References Cited

U.S. PATENT DOCUMENTS

| | | |
|---|---|---|
| 9,401,925 B1 | 7/2016 | Guo et al. |
| 10,063,654 B2 | 8/2018 | Kirti et al. |
| 2015/0143456 A1* | 5/2015 | Raleigh ............... H04W 12/088 726/1 |
| 2018/0219879 A1 | 8/2018 | Pierce |
| 2018/0255080 A1 | 9/2018 | Paine |
| 2018/0288063 A1 | 10/2018 | Koottay et al. |
| 2018/0375886 A1 | 12/2018 | Kirti et al. |

OTHER PUBLICATIONS

Oracle Corporation—2016, "Using Oracle CASB Cloud Service". https://docs.oracle.com/en/cloud/paas/casb-cloud/palug/cloud-security-monitoring.html#GUID-930305AD-4051-4A7C-8063-26D2A882BF40, 8 pages.
Fiala, J. 2015. "A Survey of Machine Learning Applications to Cloud Computing". 26 pages.

* cited by examiner

*Primary Examiner* — Anthony D Brown
(74) *Attorney, Agent, or Firm* — Lowenstein Sandler LLP

(57) ABSTRACT

A security profile manager receives a request to add a user to a cloud computing environment and generates a security profile for the user that includes an attribute associated with usage activity of a resource category available to the user. The security profile manager monitors the usage activity of the resource category by the user in view of the security profile, determines a security vulnerability value for the user in view of the usage activity, and executes a security audit operation on the security profile in view of the security vulnerability value.

20 Claims, 5 Drawing Sheets

SECURITY VULNERABILITY ASSESSMENT FOR USERS OF A CLOUD COMPUTING ENVIRONMENT

TECHNICAL FIELD

The present disclosure is generally related to computer systems, and more particularly, to security vulnerability assessment of users of cloud computing systems.

BACKGROUND

Platform-as-a-Service (PaaS) system offerings can include software and/or hardware facilities for facilitating the execution of web applications in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) hosted on its computer hardware available to customers for this purpose. The cloud provider can provide an interface that a user can use to requisition virtual machines and associated resources such as security policies, processors, storage, and network services, etc., as well as an interface to install and execute the user's applications and files on the virtual machines.

PaaS offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
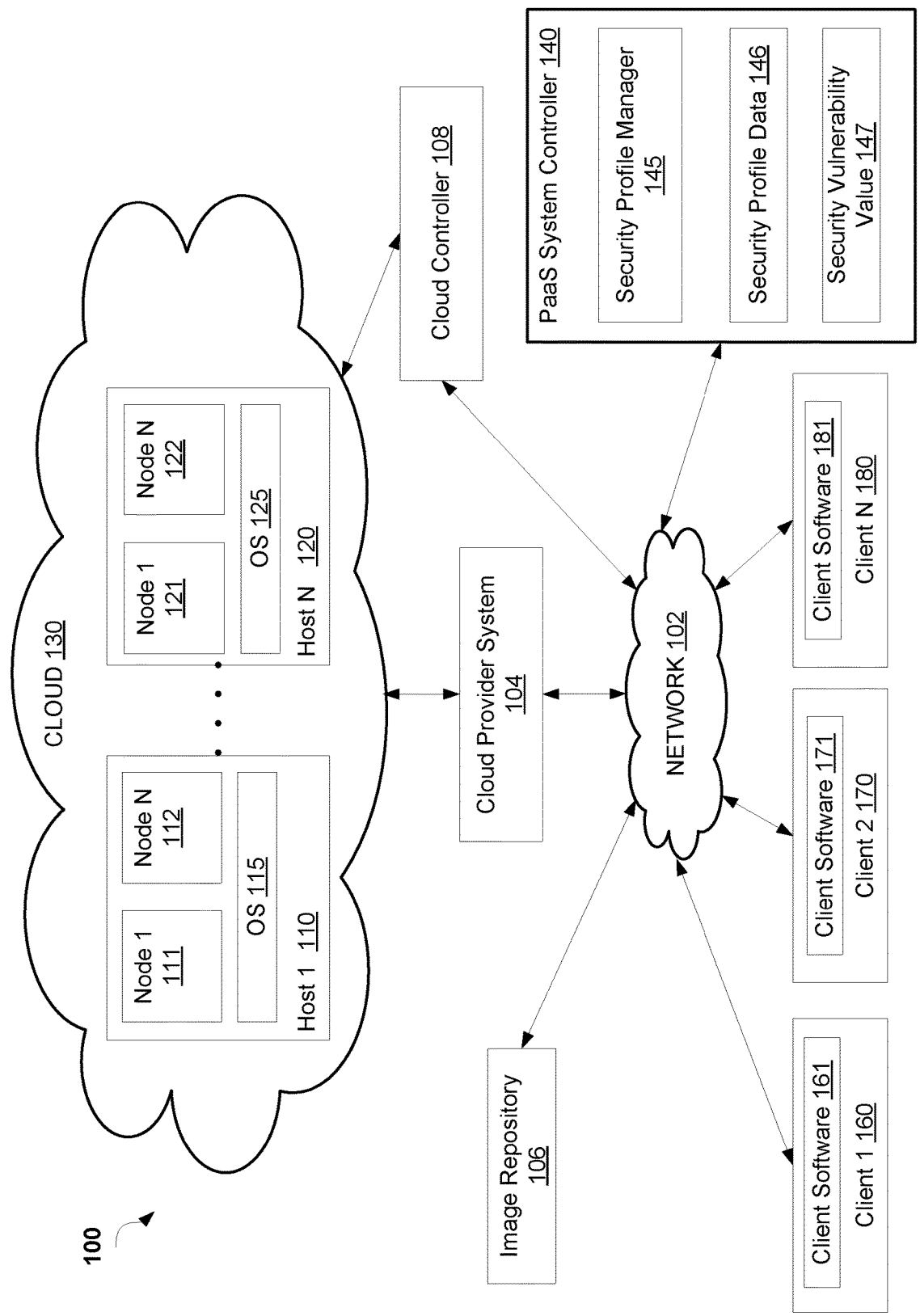
FIG. 1 depicts a high-level component diagram of an example computer system architecture, in accordance with one or more aspects of the present disclosure.

Described herein are methods and systems for security vulnerability assessment for users of a cloud computing environment. Cloud computing environments provide many advantages over locally owned computing systems. For example, cloud computing environments can optimize resources by sharing them across multiple users and multiple clients, thereby reducing costs otherwise dedicated to procuring and maintaining local hardware. Additionally, cloud computing environments provide improved scalability for clients. Instead of purchasing additional local computing resources, supporting more data storage and buying more software licenses to support growth in the business, users can rent more storage space, acquire more bandwidth and increase access to software programs which are controlled by a cloud computing provider. Moreover, cloud computing environments can provide centralized security protocols to protect network traffic across the entire environment. Cloud computing environments, however, can still expose systems to security vulnerabilities. In some instances, user activity within the environment that may be susceptible to security exploits can pose security risks but may go undetected until an actual security violation occurs.

Some conventional cloud computing environments mitigate security risks by monitoring network traffic within the environment to identify specific instances of known security exploits. For example, conventional systems can conduct virus and malware scans for known problems. Similarly, conventional systems can identify suspect network traffic based on traffic volume and/or attempted communication with network addresses known to be susceptible to exploit. Moreover, conventional systems can implement security policies that restrict user access to particular files, file systems, applications, and other system resources. These types of security protocols, however, examine activity known to present security risks or that are otherwise unacceptable. These types of security solutions are not equipped to examine activity that is completely acceptable and not violating any security policy, yet may nevertheless pose potential security risks to the environment based on the type of resources being accessed.

Aspects of the present disclosure address the above noted and other deficiencies by implementing a security profile manager (e.g., as a computer program or a computer program component) to facilitate security vulnerability assessment for users of a cloud computing environment. When a user is added to a cloud computing environment, a security profile may be configured for the user that identifies resource categories to which the user has been granted access. The user's usage activity may be monitored for each of the resource categories, and a security vulnerability value may be determined that represents an overall probability that the user's activity, while not violating defined security policies, may still be susceptible to security exploit. If the security vulnerability value satisfies a threshold condition, the security profile manager can execute a security audit operation to flag the user's behavior as potentially problematic and take remedial action to reduce the user's exposure to security exploits. Thus, aspects of the present disclosure can provide a forward-looking security model to protect a cloud computing environment from exploits that may not be readily identified using traditional techniques.

Aspects of the present disclosure present advantages over conventional solutions to the issues noted above. First, the security profile manager provides the ability to make a proactive risk assessment based on a user's activity rather than retroactively based on predefined rules for security violations. This can reduce the overall system risk posed by security violations by identifying risky behavior before that behavior results in a security violation. Thus, the negative consequences of a security violation (e.g., system downtime, data corruption, theft of sensitive data) can be dramatically reduced. Additionally, by analyzing user behavior with respect to resource categories, the security profile manager can identify risky behavior without needing to identify specific security exploits. This can provide a more flexible and efficient security monitoring system, since the security profile manager can identify new potential security threats without being updated or reconfigured with information specific to new threats. Thus, the security profile manager can successfully examine activity that is completely acceptable and not violating any security policy, yet may pose potential security risks to the environment based on the type of resources being accessed.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as OpenShift®. The PaaS system provides resources and services (e.g., micro-services) for the development and execution of applications owned or managed by multiple users. A PaaS system provides a platform and environment that allow users to build applications and services in a clustered compute environment (the "cloud") Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes a cloud-computing environment 130 (also referred to herein as a cloud) that includes nodes 111, 112, 121 to execute applications and/or processes associated with the applications. A "node" providing computing functionality may provide the execution environment for an application of the PaaS system. In some implementations, the "node" may refer to a virtual machine (VM) that is hosted on a physical machine, such as host 1 110 through host N 120, implemented as part of the cloud 130. For example, nodes 111 and 112 are hosted on physical machine of host 1 110 in cloud 130 provided by cloud provider 104. In some implementations, an environment other than a VM may be used to execute functionality of the PaaS applications. When nodes 111, 112, 121 are implemented as VMs, they may be executed by operating systems (OSs) 115, 125 on each host machine 110, 120.

In some implementations, the host machines 110, 120 are often located in a data center. Users can interact with applications executing on the cloud-based nodes 111, 112, 121 using client computer systems, such as clients 160, 170 and 180, via corresponding client software 161, 171 and 181. Client software 161, 171, 181 may include an application such as a web browser. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. In view of these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each node 111, 112, 121. This data may be used for the execution of applications for a multi-tenant PaaS platform managed by the PaaS system controller 140.

In one implementation, the data used for execution of applications can include application images built from pre-existing application components and source code of users managing the application. An image may refer to data representing executables and files of the application used to deploy functionality for a runtime instance of the application. In one implementation, the image can be built using a Docker™ tool and is referred to as a Docker image. In other implementations, the application images can be built using other types of containerization technologies. An image build system (not pictured) can generate an application image for an application by combining a preexisting ready-to-run application image corresponding to core functional components of the application (e.g., a web framework, database, etc.) with source code specific to the application provided by the user. The resulting application image may be pushed to image repository 106 for subsequent use in launching instances of the application images for execution in the PaaS system.

Upon receiving a command identifying specific data (e.g., application data and files, such as application images, used to initialize an application on the cloud) from the PaaS system controller 140, the cloud provider 104 retrieves the corresponding data from the image repository 106, creates an instance of it, and loads it to the hosts 110, 120 to run on nodes 111, 112, 121, 122. In addition, a command may identify specific data to be executed on one or more of the nodes 111, 112, 121, and 122. The command may be received from the cloud controller 108, from the PaaS system controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based discs, solid-state-drives (SSDs) or hard drives.

In some implementations, the PaaS system controller 140 may include a security profile manager 145 that implements security vulnerability assessment for users of the cloud-based PaaS system described above. The security profile manager 145 can generate a security profile for each user to monitor the user's vulnerability to system security exploits. In some implementations, a security exploit may be a portion of a software component, a portion of data, or a sequence of commands that takes advantage of a system bug or vulnerability, causing unintended or unanticipated behavior to occur within a computer system. In some implementations, a security exploit can be based on a particular type of usage, exposing a system weakness and allowing an external third party (e.g., an unauthorized user, hacker, external system, etc.) to exploit the weakness and gain access to the environment. Examples of unanticipated behaviors can include gaining control of a computer system, allowing modification of access privileges, a denial-of-service (e.g., DoS, DDoS, etc.) attack, allowing access, modification, or deletion of sensitive data, or the like. For example, if a user receives a file through email, and attempts to access the file, instructions embedded within the file could open a particular communication port on the user's computer to provide a third party with access to the user's computer.

In various implementations, security profile manager 145 can create the security profile with attributes associated with various resource categories to which the user is provided access by the cloud-based PaaS system. For example, a user that is granted access to files and applications may have a security profile that includes attributes that account for that user's usage activity with respect to the amount of time spent accessing files, the number of different files accessed, the particular files accessed, the amount of time spent accessing applications, the number of different applications accessed, the particular applications being accessed, or the like. Similarly, the security profile may include attributes associated with system level resource categories associated with the user such as security policies, network activity, storage utilization, total run time statistics, computing power/cycles used, user identity information, or other similar configuration information.

Security profile manager 145 can generate the security profile for the user (e.g., security profile 146) that includes attributes associated with some or all of the above resource categories. Security profile manager 145 can then monitor the user's usage activity of each of the resource category attributes in the security profile and determine a security vulnerability value for the user (e.g., security vulnerability value 147) based on the monitored usage activity. For example, if a user has access to files, security profile manager 145 can determine the probability that the user may be vulnerable to a file-based security exploit based on the user's observed file-based usage activity. In some implementations, security profile manager 145 can determine the overall security vulnerability of a user by determining the individual resource vulnerability associated with each of the resource category attributes in the security profile. Thus, if the user also has access to applications, security profile manager can determine the probability that the user may be vulnerable to an application-based security exploit, then combine that resource vulnerability value with the value determined for file-based security exploits to determine the overall security vulnerability value for the user. In such instances, the security vulnerability value can indicate a user's overall probability of encountering a security exploit based on that user's overall activity within the cloud-based PaaS environment. In various implementations, the security vulnerability value can be updated as a user continues to access and utilize the resources of the environment.

Once the security vulnerability value has been determined for the user, security profile manager 145 can then determine whether or not to execute a security audit operation for the user in view of that user's vulnerability to security exploits in relation to other users of the cloud-based system. For example, security profile manager 145 may determine whether the user's security vulnerability value satisfies a threshold condition, and if so, execute the security audit operation. In some implementations, security profile manager 145 may determine the threshold condition by monitoring the usage for other users of the system, determine security vulnerability values for the users, and set a threshold based on the security vulnerability values for the users.

Once a determination has been made as to the vulnerability of the user (e.g., if the threshold condition has been satisfied) security profile manager 145 can then execute the audit operation by modifying the user's access privileges, sending a notification to an interested party regarding the user's level of security vulnerability, or the like. Security profile manager 145 is described in further detail below with respect to FIG. 2.

While aspects of the present disclosure describe the security profile manager as implemented in a PaaS environment, it should be noted that in other implementations, the security profile manager can also be implemented in an Infrastructure-as-a-Service (Iaas) environment, such as such as Red Hat OpenStack®.

Figure 2:
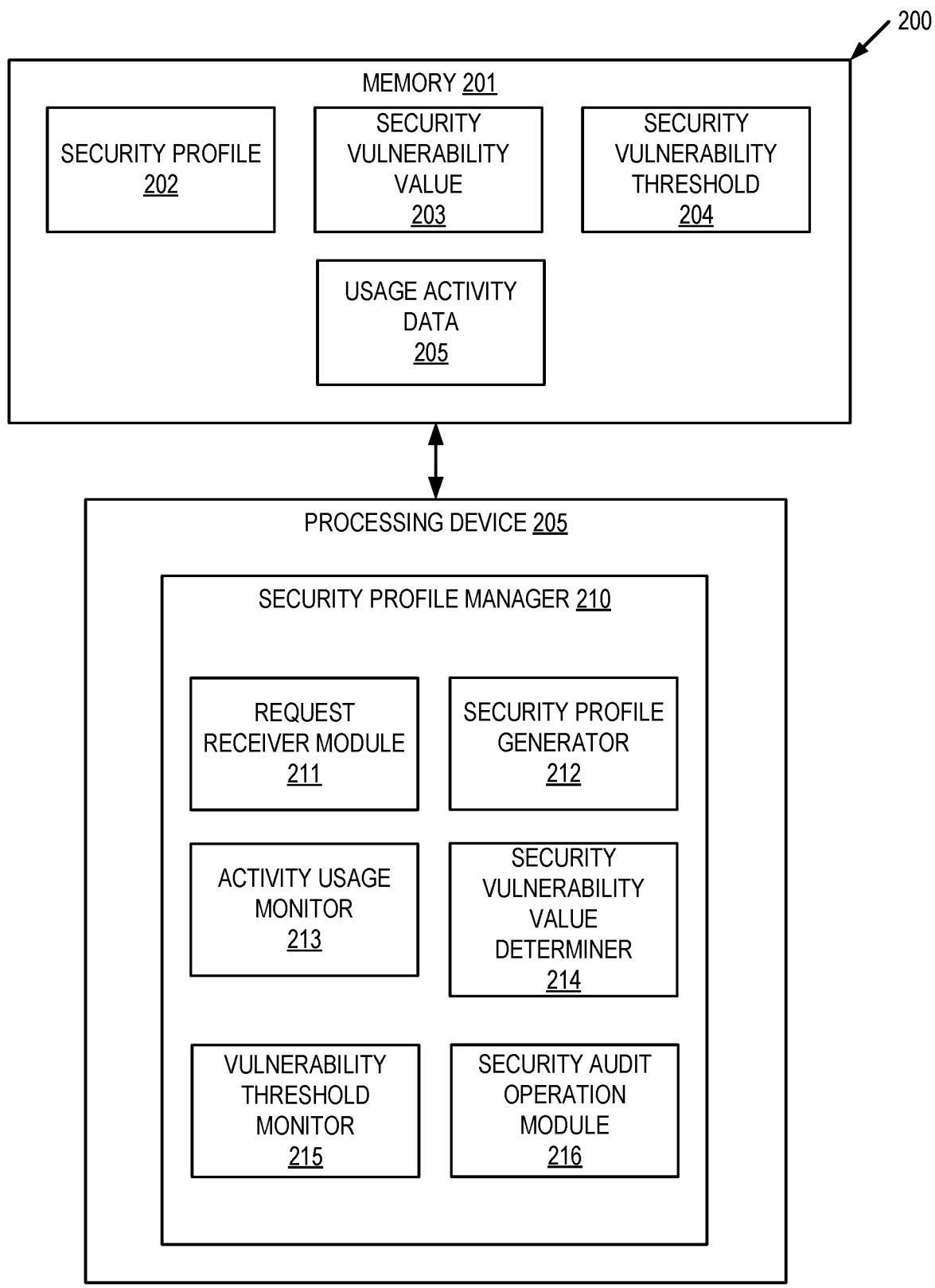
FIG. 2 depicts a block diagram illustrating an example of a security profile manager, in accordance with one or more aspects of the present disclosure.

FIG. 2 depicts a block diagram illustrating an example of a security profile manager 210 for facilitating security vulnerability assessment for users of a cloud-computing environment. In some implementations, security profile manager 210 may correspond to security profile manager 145 of FIG. 1. As shown in FIG. 2, security profile manager 210 may be a component of a computing apparatus 200 that includes a processing device 205, operatively coupled to a memory 201, to execute security profile manager 210. In some implementations, processing device 205 and memory 201 may correspond to processing device 502 and main memory 504 respectively as described below with respect to FIG. 5.

Security profile manager 210 may include request receiver module 211, security profile generator 212, activity usage monitor 213, security vulnerability value determiner 214, vulnerability threshold monitor module 215, and security audit operation execution module 216. Alternatively, the functionality of one or more of request receiver module 211, security profile generator 212, activity usage monitor 213, security vulnerability value determiner 214, vulnerability threshold monitor module 215, and security audit operation execution module 216 may be combined into a single module or divided into multiple sub-modules.

Request receiver module 211 is responsible for receiving a request to add a user to a cloud computing environment. In some implementations, the cloud computing environment may correspond to the environment described above with respect to FIG. 1. The request may include information specific to the user (e.g., user credential information) as well as resource categories to which the user may be granted access (e.g., files, applications, etc.) as well as system configuration information to be used to configure the user's environment (e.g., security policy information, network connectivity information, storage capacity, memory requirements, processor requirements, etc.). Request receiver module 211 may then use this information to configure the user's access to the cloud computing environment, or may provide this information to a separate component of the cloud computing environment to configure the user's access (e.g., cloud controller 108 or cloud provider system 104 of FIG. 1). Request receiver module 211 may then provide this information to security profile generator 212 for use in generating the security profile for the user.

Security profile generator 212 is responsible for generating a security profile for the user (e.g., security profile 202) that can be used to assess the user's vulnerability to security exploits based on that user's usage patterns. Security profile generator 212 can generate the security profile to include an attribute associated with usage activity for each resource category (e.g., a file resource category, an application resource category, a security policy resource category, a system configuration category, etc.) to which the user has been granted access or that has been used to configure the user's access. Alternatively, security profile generator 212 can generate the security profile to include attributes for a subset of the resource categories associated with the user account. For example, the user may have access to files and applications, and be associated with a particular security policy. Security profile generator 212 can generate the security policy for the user with three attributes (e.g., a file attribute, an applications attribute, and a security policy attribute). Alternatively, security profile generator 212 can generate the security policy to include less than three attributes (e.g., a file attribute and an application attribute).

Activity usage monitor 213 is responsible for monitoring the usage activity for the user in view of the attributes stored in the user's security profile. Activity usage monitor 213 may identify each of the attributes of the security profile and monitor the usage activity of the resource categories associated with the security profile attributes. In various implementations, activity usage monitor 213 can monitor the usage activity by receiving real-time usage data from the cloud computing environment. Alternatively, the usage activity data may be stored as historical data in a data store or a local memory cache which may be accessed by activity usage monitor 213.

In an illustrative example, activity usage monitor 213 can identify an attribute in the security profile that is associated with a file resource category (e.g., the user has been granted access to work with files). Activity usage monitor 213 can then monitor the user's usage activity of different files within the cloud computing environment. The usage activity with respect to files can include total time working with files, total time working with each particular file, number of files accessed, types of files (e.g., word processing files, spreadsheet files, presentation files, executable code, source code, etc.), computing resources used while interacting with files (e.g., memory, storage, processing resources, etc.), or other similar information. Activity usage monitor 213 can then compile and store the collected usage activity (e.g., usage activity data 205) for use with security vulnerability determiner 214 described below.

In another example, activity usage monitor 213 can identify an attribute in the security profile that is associated with an application resource category (e.g., the user has been granted access to work with applications). Activity usage monitor 213 can then monitor the user's usage activity of different applications within the cloud computing environment. The usage activity with respect to applications can include total time working with applications, total time working with each particular application, number of applications accessed, types of applications (e.g., applications coded and/or tested by the user, third party applications used to access files in the environment, local applications, web-based applications that execute within a browser, etc.) computing resource used while interacting with applications (e.g., memory, storage, processing resources, etc.), or other similar information.

In another example, activity usage monitor 213 can identify an attribute in the security profile that is associated with a security policy resource category (e.g., the user's account is associated with a particular security). Activity usage monitor 213 can then monitor the user's usage activity within the cloud computing environment to determine whether the user has violated the security policy. Similarly, activity usage monitor 213 can determine whether and/or how often the security policy has been misconfigured for the user (e.g., the user should be permitted access to a resource but the policy is configured to prevent that access). In some implementations, activity usage monitor 213 can make this determination by monitoring policy violation alert notifications generated by the user's usage activity within the environment (e.g., scanning the stored historical data). Alternatively, activity usage monitor 213 can receive notifications from a separate analysis component (not pictured) that is configured to perform a policy auditing process. In some implementations, the usage activity with respect to policies can also include total number of misconfigurations, types of resources that are affected (e.g., files, applications, etc.) computing resource affected by misconfigurations (e.g., memory, storage, processing resources, etc.), or other similar information.

In some implementations, activity usage monitor 213 can identify attributes in the security profile associated with a system configuration resource category (e.g., network connectivity information, storage capacity, memory requirements, processor requirements, etc.). Activity usage monitor 213 can then monitor the user's usage activity associated with different system resource. The usage activity with respect to system resources can include total time engaging in network connectivity, network addresses to which the user is connecting, memory usage statistics, storage usage statistics, processing resource statistics, or the like.

Security vulnerability value determiner 214 is responsible for determining a security vulnerability value (e.g., security vulnerability value 203) for the user in view of the usage activity captured by activity usage monitor 213. The security vulnerability value can indicate a user's overall probability of encountering a security exploit based on that user's overall usage of the various resources within the cloud computing environment. In some implementations, security vulnerability value determiner 214 can make this determination using a conditional probability framework such as a Bayesian machine learning sub-system a neural network, a decision tree, or any other similar type of machine learning component.

In some implementations, security vulnerability value determiner 214 can determine the overall security vulnerability value for the user by first determining individual resource vulnerability values for each monitored resource attribute of the security profile. For example, if a user profile includes attributes associated with a file resource category, an application resource category, and a policy resource category, security vulnerability value determiner 214 can determine resource vulnerability values for each of the three attributes. In some implementations, security vulnerability value determiner 214 can determine a resource vulnerability value for a file attribute by determining the probability that the user may be vulnerable to a file-based security exploit). Similarly, security vulnerability value determiner 214 can determine a resource vulnerability value for an application attribute by determining the probability that the user may be vulnerable to an application-based security exploit). Moreover, security vulnerability value determiner 214 can determine a resource vulnerability value for a policy attribute by determining the probability that the user may be vulnerable to a policy-based security exploit. Security vulnerability value determiner 214 can then determine the overall security vulnerability value for the user by combining the three security vulnerability values.

In some implementations, security vulnerability value determiner 214 can determine a resource vulnerability value by first determining the probability of selecting a particular resource from the applicable resource category. Security vulnerability value determiner 214 can make this determination in view of the usage activity of the applicable resource category for the user. For example, if the applicable resource category involves files, security vulnerability value determiner 214 can determine the probability of the user selecting a particular file to which the user has access based on the user's historical usage activity. Thus, if the user has access to 10 files, and typically selects two at a time, security vulnerability value determiner 214 can determine the probability of selecting any two files out of the total 10 files.

Security vulnerability value determiner 214 can then determine the probability that the particular resource selected is associated with a security exploit. As with the first probability value, security vulnerability value determiner 214 can make this determination in view of usage activity for the user. Alternatively, security vulnerability value determiner 214 can make this determination using file-based usage activity for all users of the cloud computing environment. Thus, to continue the example above, having selected two files out of the ten, security vulnerability value determiner 214 can determine the probability that the two selected files are associated with a security exploit (e.g., the files include a virus, unauthorized executable code, cause unauthorized network activity, etc.). Security vulnerability value determiner 214 can determine the overall resource vulnerability value by combining the two probability values.

In various implementations, security vulnerability value determiner 214 can repeat the above process for each monitored resource category attribute in the security profile. Thus, for the three attribute example noted above (files, applications, policies), security vulnerability value determiner 214 can determine the resource vulnerability value for applications by determining the probability of the user selecting a particular application (or set of applications) in view of the user's historical application usage activity. Security vulnerability value determiner 214 can then determine the probability that the selected particular application (or set of applications) is associated with a security exploit (e.g., the application includes a virus, trojan horse, unauthorized executable code, causes unauthorized network activity, etc.). Security vulnerability value determiner 214 can then determine the resource vulnerability value for applications by combining the two probability values.

Similarly, security vulnerability value determiner 214 can determine the resource vulnerability value for security policies by determining the probability of the user being associated with a particular security policy within the cloud computing environment in view of the security policies of the cloud computing environment. Security vulnerability value determiner 214 can then determine the probability that the particular policy has been misconfigured based on historical activity for all users of the cloud computing environment. Security vulnerability value determiner 214 can then determine the resource vulnerability value for security policies by combining the two probability values.

Moreover, security vulnerability value determiner 214 can make similar probability determinations for a user's usage of system configuration resources such as memory usage, storage usage, processing usage, networking activity usage, or the like.

Once the resource vulnerability values have been determined for the applicable resource category attributes in the security profile, security vulnerability value determiner 214 can combine them into the overall security vulnerability value for the user. Thus, continuing the three attribute example described above, security vulnerability value determiner 214 can determine the security vulnerability value by combining the file resource vulnerability value, the application resource vulnerability value, and the security policy vulnerability value. In implementations where additional resource categories are included, the applicable resource vulnerability values may also be included in the overall determination.

Vulnerability threshold monitor 215 is responsible for determining whether the security vulnerability value determined by security vulnerability value determiner 214 meets a threshold condition (e.g., security vulnerability threshold 204). In some implementations, the threshold can indicate whether any particular user across the cloud computing environment is at a risk being exposed to a security exploit of any type. In some implementations, the threshold condition can be preset when the environment is initially configured and subsequently updated as users continue to use the resources available (and additional usage data is collected and monitored). In such cases, a machine learning process can be implemented to continue to monitor usage activity, learning from the ongoing usage data and updating the threshold accordingly.

To determine the threshold, security vulnerability value determiner 214 may identify a group of additional users of the cloud computing environment. In some implementations, security vulnerability value determiner 214 may identify all other users of the environment. Alternatively, security vulnerability value determiner 214 may select a subset of users of the environment. For example, security vulnerability value determiner 214 may identify additional users that are associated with the same work group as the monitored user, utilize similar resource categories as the monitored user, exhibit similar usage patterns as the monitored user, or the like.

Security vulnerability value determiner 214 can then select a set of security profiles associated with the identified group of additional users, and determine security vulnerability values for each of the selected security profiles. Security vulnerability value determiner 214 can then determine the threshold condition using the determined security vulnerability values. Thus, the threshold can account for the overall probability of security vulnerability of all users of the environment.

Vulnerability threshold monitor 215 may then determine whether the security vulnerability value determined by security vulnerability value determiner 214 satisfies the threshold condition by comparing the security vulnerability value to the security vulnerability threshold. In some implementations, if the security vulnerability value meets or exceeds the security vulnerability threshold, vulnerability threshold monitor 215 can determine that the threshold condition has been met. Note, that while vulnerability threshold monitor 215 is depicted in FIG. 2 as a separate component of security profile manager 210, in other implementations, vulnerability threshold monitor 215 may be incorporated into other components such as security vulnerability value determiner 214 or security audit operation module 216.

Security audit operation execution module 216 is responsible for executing a security audit operation on the security profile in view of the security vulnerability value determined by security vulnerability value determiner 214. In some implementations, security audit operation execution module 216 may be invoked responsive to determining that the security vulnerability value meets the threshold condition (e.g., there is a probability that the monitored user is vulnerable to a security exploit). A security audit operation can include systemic actions to be taken in response to detecting that a user's observed activity indicates a vulnerability to security exploits.

For example, security audit operation execution module 216 may execute the security audit operation by sending an alert or notification to interested parties within the cloud computing environment. In some implementations, the interested party may be an administrator, a manager of the user, the monitored user, or a connected security auditing system. The notification can include an email, text message (e.g., SMS message), or other electronic communication notification.

In another example, security audit operation execution module 216 may execute the security audit operation by modify the access privileges of the monitored user. Security audit operation execution module 216 may first determine the current access privileges of the resource categories for the user, and modify the access privilege level of those categories in view of the security vulnerability value.

In some implementations, security audit operation execution module 216 can analyze the components of the security vulnerability value (e.g., the resource vulnerability value components determined by security vulnerability value determiner 214) to identify the resource category (or categories) that present the greatest probability of vulnerability to a security exploit. Subsequently, security audit operation execution module 216 can modify the access privilege level for the resource (or resources) that present the greatest vulnerability. For example, if security audit operation execution module 216 determines that the user is most vulnerable to file-based exploits, that user's file access privileges may be modified (e.g., the user's privilege may be changed to read only access, the user may be restricted from accessing any files of a particular type, the amount of time to access files may be restricted, etc.). Similarly, if security audit operation execution module 216 determines the user is most vulnerable to applications, that user's application access privileges may be similarly modified. Moreover, if security audit operation execution module 216 determines that the user is most vulnerable to network connectivity exploits, that user's network connectivity may be restricted or blocked.

In some implementations, security audit operation execution module 216 can initiate a security auditing process that disables the user's access to the cloud computing environment entirely until a detailed examination of that user's activity has been reviewed by an auditor or auditing service. The user's access can remain disabled until security audit operation execution module 216 receives a notification to restore access to the user.

In some implementations, security audit operation execution module 216 can generate recommendations for modifying the configuration for the user's access to the cloud computing environment. In such cases, security audit operation execution module 216 can perform clustering analysis on the historical data of usage activity for all users into a subset indicative of a low probability of vulnerability to security exploits. Security audit operation execution module 216 can then identify environment configuration attributes for the subset that are indicative of lower vulnerability risk and compare those attributes to the attributes of the monitored user. Security audit operation execution module 216 can then generate a list of recommended changes to the monitored user's environment configuration to lower that user's vulnerability to security exploits.

Figure 3:
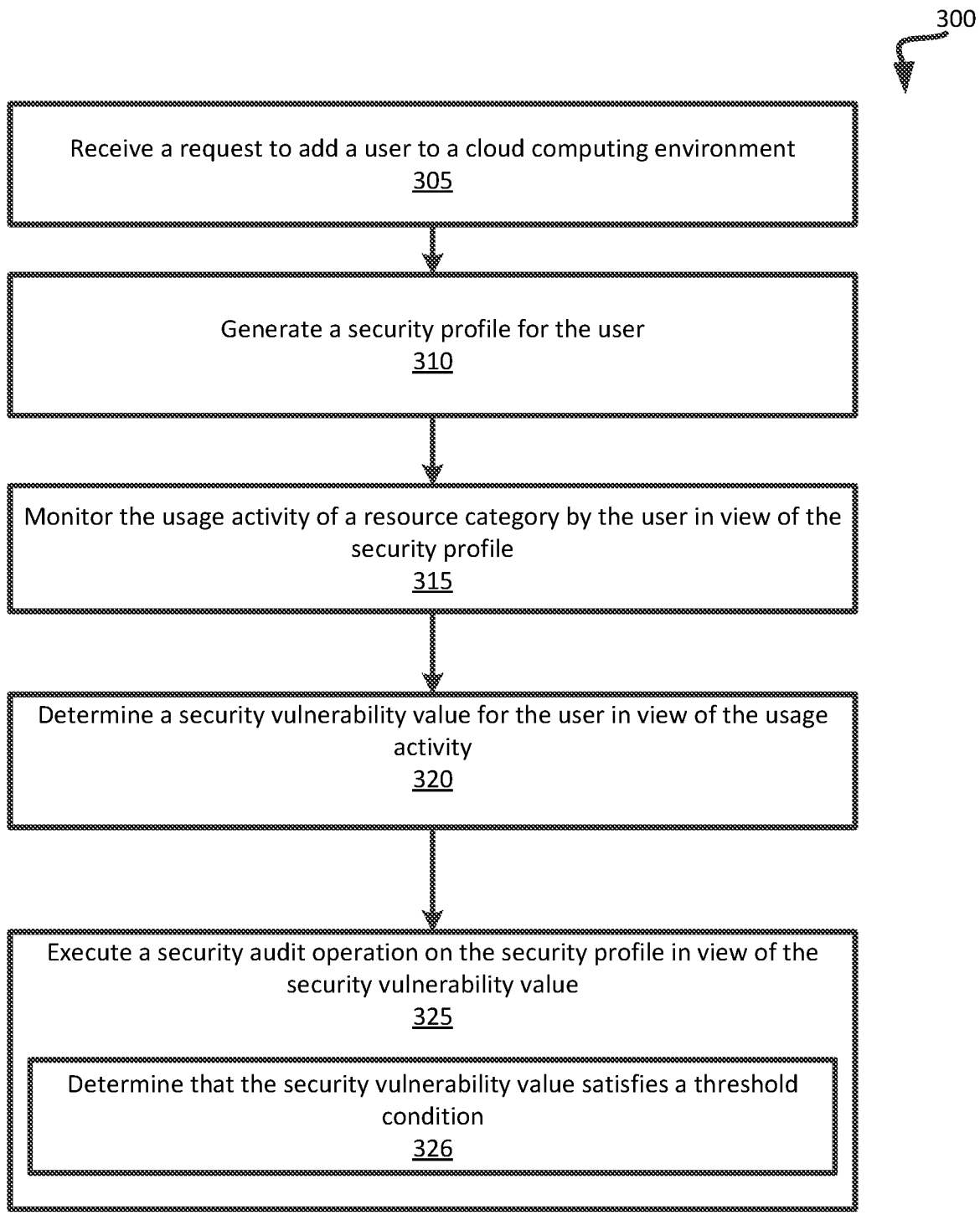
FIG. 3 depicts a flow diagram of a method for security vulnerability assessment for users of a cloud computing environment, in accordance with one or more aspects of the present disclosure.

FIG. 3 depicts a flow diagram of an example method 300 for security vulnerability assessment for users of a cloud computing environment. The method may be performed by processing logic that may comprise hardware (circuitry, dedicated logic, etc.), computer readable instructions (run on a general purpose computer system or a dedicated machine), or a combination of both. In an illustrative example, method 300 may be performed by security profile manager 145 in FIG. 1, or security profile manager 210 in FIG. 2. Alternatively, some or all of method 300 might be performed by another module or machine. It should be noted that blocks depicted in FIG. 3 could be performed simultaneously or in a different order than that depicted.

At block 305, processing logic receives a request to add a user to a cloud computing environment. In some implementations, the could computing environment can include one or more resource categories available to the user. At block 310, processing logic generates a security profile for the user. In some implementations, the security profile includes an attribute associated with usage activity of a particular resource category of the one or more resource categories included in the cloud computing environment. At block 315, processing logic monitors the usage activity of the resource category by the user in view of the security profile generated at block 310.

At block 320, processing logic determines a security vulnerability value for the user in view of the usage activity monitored at block 315. In some implementations, processing logic can determine the security vulnerability value as described below with respect to FIG. 4. At block 325, processing logic executes a security audit operation on the security profile in view of the security vulnerability value determined at block 320. In some implementations, processing logic can execute the security audit operation by first invoking block 326 to determine that the security vulnerability value satisfies a threshold condition. After block 325, the method of FIG. 3 terminates.

Figure 4:
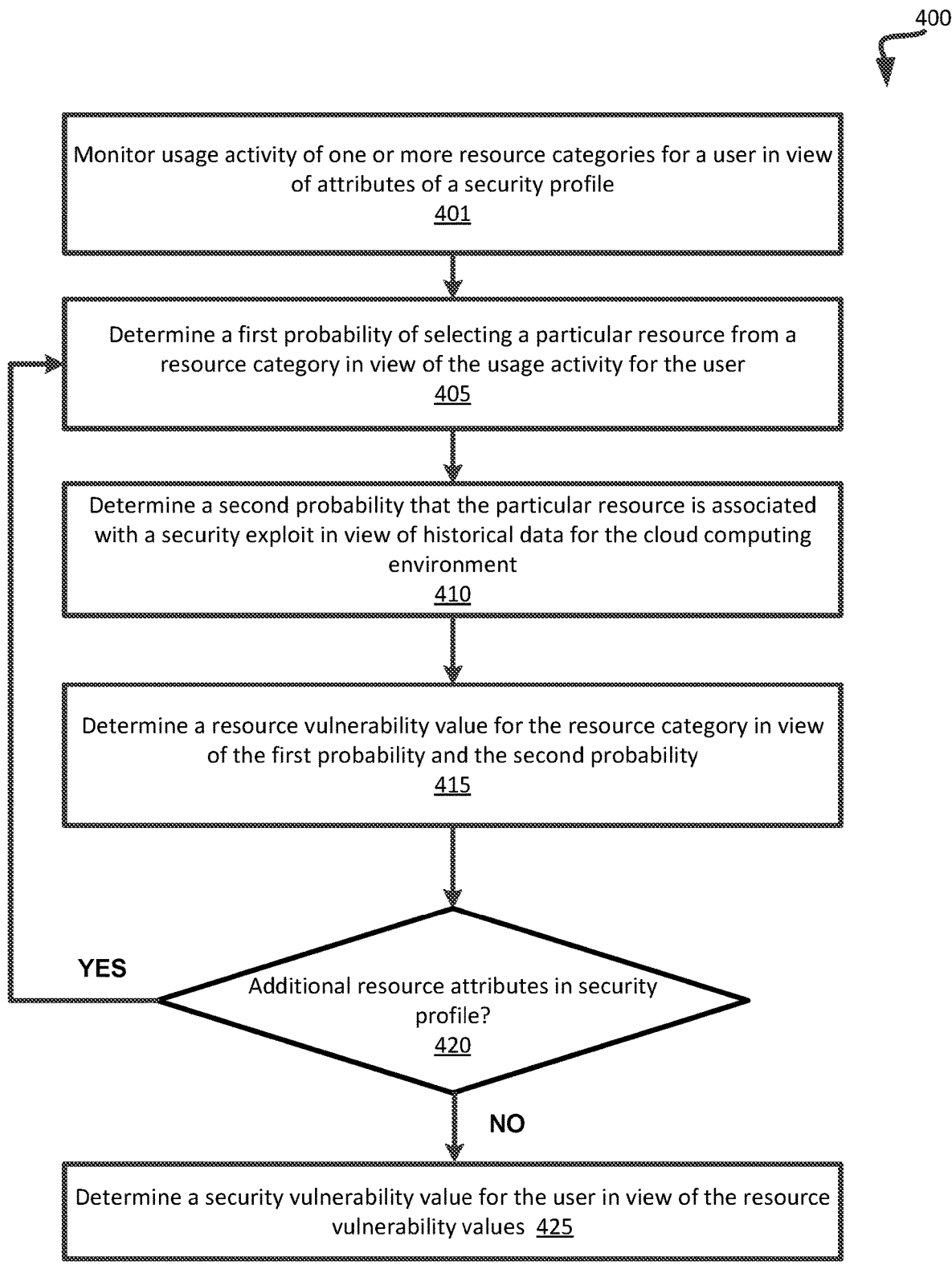
FIG. 4 depicts a flow diagram of a method for determining a security vulnerability value for a user, in accordance with one or more aspects of the present disclosure.

FIG. 4 depicts a flow diagram of an example method 400 for determining a security vulnerability value for a user. The method may be performed by processing logic that may comprise hardware (circuitry, dedicated logic, etc.), computer readable instructions (run on a general purpose computer system or a dedicated machine), or a combination of both. In an illustrative example, method 300 may be performed by security profile manager 145 in FIG. 1, or security profile manager 210 in FIG. 2. Alternatively, some or all of method 400 might be performed by another module or machine. It should be noted that blocks depicted in FIG. 4 could be performed simultaneously or in a different order than that depicted.

At block 401, processing logic monitors usage activity of one or more resource categories for a user in view of a security profile. In some implementations, the security profile includes attributes associated with the usage activity of the resource categories. At block 405, processing logic determines a first probability of selecting a particular resource from a resource category in view of the usage activity for the user. At block 410, processing logic determines a second probability that the particular resource is associated with a security exploit in view of historical data for the cloud computing environment.

At block 415, processing logic determines a resource vulnerability value for the resource category in view of the first probability determined at block 405 and the second probability determined at block 410. At block 420, processing logic determines whether the security profile includes additional resource category attributes. If so, processing returns to block 405 to determine an additional resource vulnerability value for any additional resource category attributes. Otherwise, processing proceeds to block 425. At block 425, processing logic determines a security vulnerability value for the user in view of the resource vulnerability values determined by one or more executions of blocks 405-415. After block 425, the method of FIG. 4 terminates.

Figure 5:
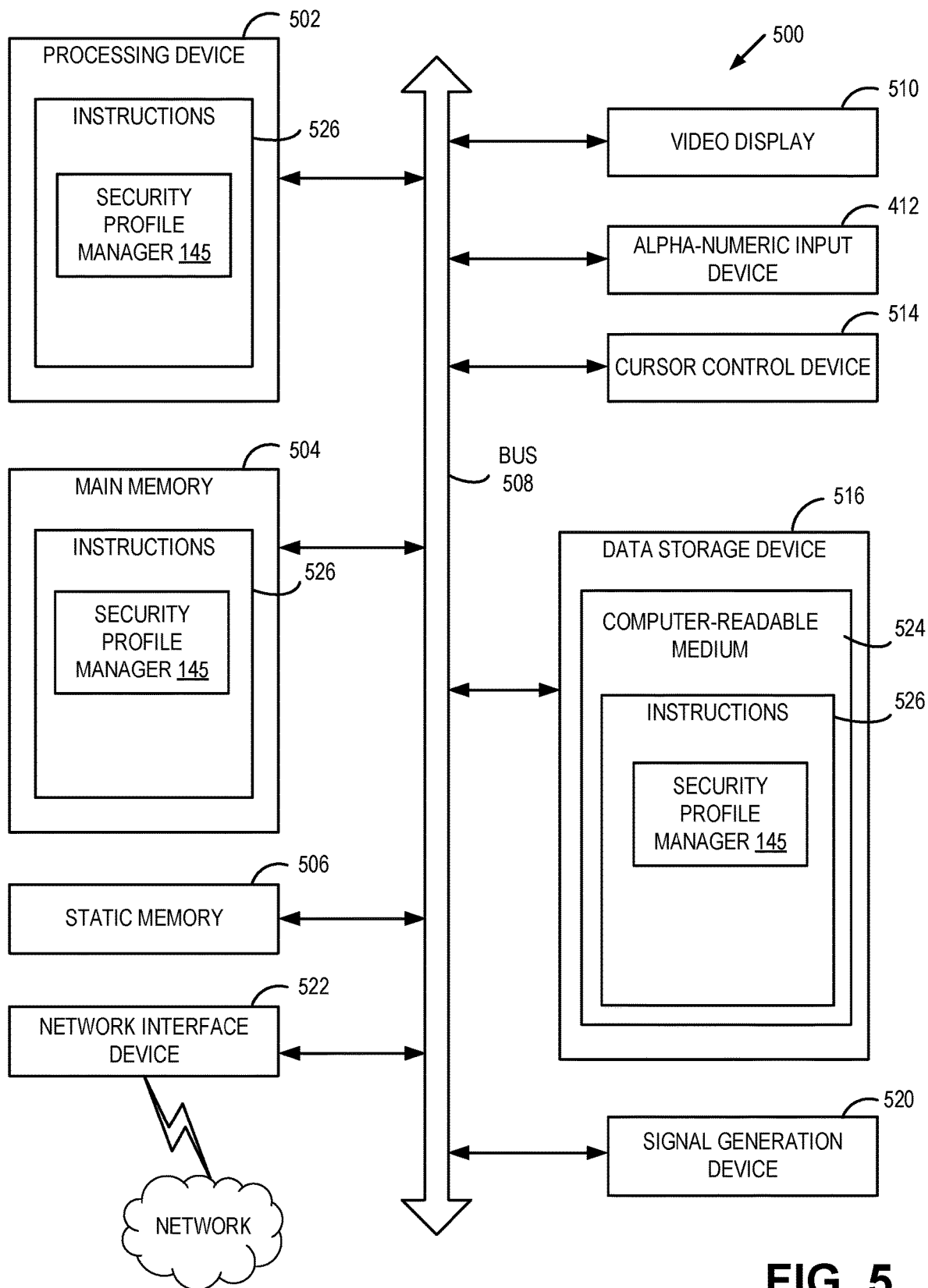
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes security profile manager 145 for performing the operations and steps discussed herein (e.g., corresponding to the methods of FIGS. 3-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include security profile manager 145 (e.g., corresponding to the methods of FIGS. 3-4, etc.) embodying any one or more of the methodologies or functions described herein. Security profile manager 145 may also reside, completely or at least partially, within the main memory 504 and/or within the processing device 502 during execution thereof by the computer system 500, the main memory 504 and the processing device 502 also constituting computer-readable media. Security profile manager 145 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "monitoring," "executing," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
   receiving, by a processing device, a request to associate a user with a cloud computing environment, wherein the cloud computing environment comprises one or more resource categories available to the user;
   generating a security profile of the user, wherein the security profile comprises an attribute associated with usage activity by the user of a resource category of the one or more resource categories;
   monitoring the usage activity of the resource category by the user in view of the attribute of the security profile;
   determining, by the processing device, a security vulnerability value associated with the user in view of the usage activity of the resource category, wherein the security vulnerability value reflects a probability of a resource selected from the resource category by the user being associated with a security exploit; and
   responsive to determining that the security vulnerability value satisfies a threshold condition, executing a security audit operation on the security profile.

2. The method of claim 1, wherein the one or more resource categories comprises at least one of a file resource category, an application resource category, a security policy resource category, or a system configuration resource category.

3. The method of claim 1, wherein determining the security vulnerability value comprises:
   determining a first probability of selecting a particular resource from the resource category in view of the usage activity of the resource category for the user;
   determining a second probability that the particular resource is associated with the security exploit in view of historical data for the cloud computing environment; and
   determining a first resource vulnerability value for the resource category in view of the first probability and the second probability.

4. The method of claim 3, wherein the security profile for the user further comprises a second attribute associated with usage activity of a second resource category of the one or more resource categories, and wherein determining the security vulnerability value further comprises:
   determining a third probability of selecting another particular resource from the second resource category in view of usage activity of the second resource category for the user;
   determining a fourth probability that the another particular resource is associated with another security exploit in view of the historical data for the cloud computing environment;
   determining a second resource vulnerability value for the second resource category in view of the third probability and the fourth probability; and
   determining the security vulnerability value in view of the first resource vulnerability value and the second resource vulnerability value.

5. The method of claim 1, further comprising:
   identifying a plurality of additional users of the cloud computing environment;
   selecting a set of additional security profiles associated with the plurality of additional users;
   determining a set of additional security vulnerability values, wherein each additional security vulnerability values in the set of additional security vulnerability values is associated with an additional security profile from the set of additional security profiles; and
   determining the threshold condition in view of the set of additional security vulnerability values.

6. The method of claim 1, wherein executing the security audit operation comprises:
   sending a notification to an administrator console that indicates that the user is vulnerable to a security exploit.

7. The method of claim 1, wherein executing the security audit operation comprises:
   determining an access privilege level of the resource category for the user; and
   modifying the access privilege level of the resource category for the user in view of the security vulnerability value.

8. A computing apparatus comprising:
   a memory; and
   a processing device, operatively coupled to the memory, to:

receive a request to associate a user with a cloud computing environment, wherein the cloud computing environment comprises one or more resource categories available to the user;

generate a security profile of the user, wherein the security profile comprises an attribute associated with usage activity by the user of a resource category of the one or more resource categories;

monitor the usage activity of the resource category by the user in view of the attribute of the security profile;

determine a security vulnerability value associated with the user in view of the usage activity of the resource category, wherein the security vulnerability value reflects a probability of a resource selected from the resource category by the user being associated with a security exploit; and execute a security audit operation on the security profile in view of the security vulnerability value.

9. The computing apparatus of claim 8, wherein the one or more resource categories comprises at least one of a file resource category, an application resource category, a security policy resource category, or a system configuration resource category.

10. The computing apparatus of claim 8, wherein to determine the security vulnerability value, the processing device is further to:

determine a first probability of selecting a particular resource from the resource category in view of the usage activity of the resource category for the user;

determine a second probability that the particular resource is associated with the security exploit in view of historical data for the cloud computing environment; and determine a first resource vulnerability value for the resource category in view of the first probability and the second probability.

11. The computing apparatus of claim 10, wherein the security profile for the user further comprises a second attribute associated with usage activity of a second resource category of the one or more resource categories, and wherein to determine the security vulnerability value, the processing device is further to:

determine a third probability of selecting another particular resource from the second resource category in view of usage activity of the second resource category for the user;

determine a fourth probability that the another particular resource is associated with another security exploit in view of the historical data for the cloud computing environment;

determine a second resource vulnerability value for the second resource category in view of the third probability and the fourth probability; and determine the security vulnerability value in view of the first resource vulnerability value and the second vulnerability value.

12. The computing apparatus of claim 8, wherein the processing device is further to:

identify a plurality of additional users of the cloud computing environment;

select a set of additional security profiles associated with the plurality of additional users;

determine a set of additional security vulnerability values, wherein each additional security vulnerability values in the set of additional security vulnerability values is associated with an additional security profile from the set of additional security profiles;

determine a threshold condition in view of the set of additional security vulnerability values; and determine that the security vulnerability value satisfies the threshold condition.

13. The computing apparatus of claim 12, wherein the processing device is further to:

send a notification to an administrator console that indicates that the user is vulnerable to a security exploit.

14. The computing apparatus of claim 12, wherein the processing device is further to:

determine an access privilege level of the resource category for the user; and modify the access privilege level of the resource category for the user in view of the security vulnerability value.

15. A non-transitory computer readable storage medium, having instructions stored therein, which when executed by a processing device of a computer system, cause the processing device to:

receive a request to associate a user with a cloud computing environment, wherein the cloud computing environment comprises one or more resource categories available to the user;

generate a security profile of the user, wherein the security profile comprises an attribute associated with usage activity by the user of a resource category of the one or more resource categories;

monitor the usage activity of the resource category by the user in view of the attribute of the security profile;

determine a security vulnerability value associated with the user in view of the usage activity of the resource category, wherein the security vulnerability value reflects a probability of a resource selected from the resource category by the user being associated with a security exploit; and responsive to determining that the security vulnerability value satisfies a threshold condition, execute a security audit operation on the security profile.

16. The non-transitory computer readable storage medium of claim 15, wherein the one or more resource categories comprises at least one of a file resource category, an application resource category, a security policy resource category, or a system configuration resource category.

17. The non-transitory computer readable storage medium of claim 15, wherein to determine the security vulnerability value, the processing device is further to:

determine a first probability of selecting a particular resource from the resource category in view of the usage activity of the resource category for the user;

determine a second probability that the particular resource is associated with the security exploit in view of historical data for the cloud computing environment; and determine a first resource vulnerability value for the resource category in view of the first probability and the second probability.

18. The non-transitory computer readable storage medium of claim 17, wherein the security profile for the user further comprises a second attribute associated with usage activity of a second resource category of the one or more resource categories, and wherein to determine the security vulnerability value, the processing device is further to:

determine a third probability of selecting another particular resource from the second resource category in view of usage activity of the second resource category for the user;

determine a fourth probability that the another particular resource is associated with another security exploit in view of the historical data for the cloud computing environment;

determine a second resource vulnerability value for the second resource category in view of the third probability and the fourth probability; and determine the security vulnerability value in view of the first resource vulnerability value and the second vulnerability value.

19. The non-transitory computer readable storage medium of claim 15, wherein the processing device is further to:

identify a plurality of additional users of the cloud computing environment;

select a set of additional security profiles associated with the plurality of additional users;

determine a set of additional security vulnerability values, wherein each additional security vulnerability values in the set of additional security vulnerability values is associated with an additional security profile from the set of additional security profiles; and determine the threshold condition in view of the set of additional security vulnerability values.

20. The non-transitory computer readable storage medium of claim 15, wherein to execute the security audit operation, the processing device is further to:

determine an access privilege level of the resource category for the user; and modify the access privilege level of the resource category for the user in view of the security vulnerability value.

* * * * *